United States Patent [19]

Saiki et al.

[11] 4,031,165

[45] June 21, 1977

[54] PROCESS FOR PREPARING POLYESTER ELASTOMERS

[75] Inventors: Noritsugu Saiki; Yoshihiko Takeuchi; Hiroshi Sakai, all of Iwakuni, Japan

[73] Assignee: Teijin Limited, Osaka, Japan

[22] Filed: Sept. 29, 1975

[21] Appl. No.: 617,844

[30] Foreign Application Priority Data

| Sept. 30, 1974 | Japan | 49-111644 |
| Oct. 3, 1974 | Japan | 49-113284 |
| Oct. 11, 1974 | Japan | 49-116163 |
| Oct. 11, 1974 | Japan | 49-116164 |
| Mar. 14, 1975 | Japan | 50-30196 |
| Mar. 27, 1975 | Japan | 50-36121 |

[52] U.S. Cl. .............................. 260/860; 260/75 P
[51] Int. Cl.² ................. C08G 81/00; C08G 63/04
[58] Field of Search .......................... 260/860, 75 P

[56] References Cited

UNITED STATES PATENTS

| 3,446,778 | 5/1969 | Waller et al. | 260/860 |
| 3,483,157 | 12/1969 | Smith et al. | 260/860 |
| 3,835,089 | 9/1974 | Fox et al. | 260/860 |

*Primary Examiner*—Wilbert J. Briggs, Sr.

*Attorney, Agent, or Firm*—Wenderoth, Lind & Ponack

[57] ABSTRACT

In a process for preparing a block copolyester elastomer having a softening point of at least 120° C. by reacting an aromatic polyester (I) having a reduced viscosity of at least 0.4 and derived from an aromatic dicarboxylic acid or its ester-forming derivative as a main acid component with an aliphatic polyester (II) having a reduced viscosity of at least 0.4 and derived from an aliphatic dicarboxylic acid or an aliphatic hydroxycarboxylic acid or an ester-forming derivative of each of these acids in the molten state; the improvement wherein A. the aromatic polyester (I) is derived from a dicarboxylic acid component more than 70 mole % of which consists of terephthalic acid and diol component more than 70 mole % of which consists of tetramethylene glycol or trimethylene glycol, B. the weight ratio of the aromatic polyester (I) to the aliphatic polyester (II) is 0.25 to 9, and C. the reaction between the polyester (I) and the polyester (II) is carried out until a polymer is obtained which has an elasticity recovery of at least 50% after it is stretched 20% and then relaxed for 5 minutes.

6 Claims, No Drawings

PROCESS FOR PREPARING POLYESTER ELASTOMERS

This invention relates to a process for preparing polyester elastomers. More specifically, it relates to a process for preparing a block copolyester elastomer consisting of an aliphatic polyester as a soft segment and an aromatic polyester as a hard segment.

A polyether-ester consisting of a polyether as a soft segment and an aromatic polyester as a hard segment is well known as a polyester elastomer. However, this kind of elastomer has the defect that because of having an ether linkage in the molecule, it is susceptible to deterioration by oxidation or light.

Another known polyester elastomer is one which contains an aliphatic polyester as a soft segment. This elastomer is a block copolyester consisting of an aliphatic polyester segment and an aromatic polyester segment, and does not contain an ether linkage. Such a block copolyester is produced by melt-blending an aliphatic polyester and an aromatic polyester to induce a partial ester-interchange reaction. In such a method, however, an undesirable random copolymerization takes place in addition to the block copolymerization reaction, and it is difficult to inhibit or prevent the random copolymerization by such a conventional method. Furthermore, the resulting product has the disadvantage that its physical properties such as tensile strength or tear strength are inferior, or its softening point is infeasibly low, for example, less the 120° C. For the above reason, the method for producing a block copolyester from an aliphatic polyester and an aromatic polyester has not proved commercially viable.

Accordingly, it is an object of this invention to provide a process which can easily afford a block copolyester containing an aliphatic polyester as a soft segment and having a high softening point and superior physical and superior physical properties.

Another object of this invention is to provide a process which can easily inhibit or prevent a random copolymerization reaction after a block copolymerization between an aromatic polyester and an aliphatic polyester has substantially been completed.

We have now found that when a specific aromatic polyester and a specific aliphatic polyester in specific proportions are block-copolymerized in the molten state to a specific extent, a block copolyester elastomer having a high softening point can be advantageously produced.

According to this invention, there is provided an improved process for preparing a block copolyester elastomer having a softening point of at least 120° C. by reacting (I) an aromatic polyester having a reduced specific viscosity of at least 0.4 derived from an aromatic dicarboxylic acid or its ester-forming derivative as a main acid component with (II) an aliphatic polyester having a reduced specific viscosity of at least 0.4 derived from an aliphatic dicarboxylic acid or its ester-forming derivative or an aliphatic hydroxycarboxylic acid or its ester-forming derivative as a main acid component in the molten state; wherein A. the aromatic polyester (I) is derived from a dicarboxylic acid component more than 70 mole% of which consists of terephthalic acid and a diol component more than 70 mole% of which consists of tetramethylene glycol or trimethylene glycol, B. the weight ratio of the aromatic polyester (I) to the aliphatic polyester (II) is 0.25 to 9, and C. the reaction between the polyester (I) and the polyester (II) is carried out until a polymer is obtained which has an elasticity recovery of at least 50% after it is stretched 20% and then relaxed for 5 minutes.

The aromatic polyester (I) used in this invention is derived from a dicarboxylic acid component more than 70 mole% of which consists of terephthalic acid and a diol component more than 70 mole% of which consists of tetramethylene glycol or trimethylene glycol.

Less than 30 mole% of the dicarboxylic acid component may comprise other dicarboxylic acids, and less than 30 mole% of the diol component may comprise other diols. Preferably, the total amount of the other dicarboxylic acid and the other diol is less than 20 mole%.

The other dicarboxylic acid that can be used has a molecular weight of not more than 300, and includes, for examples, aromatic dicarboxylic acids such as isophthalic acid, naphthalenedicarboxylic acid or diphenyldicarboxylic aid, aliphatic dicarboxylic acids such as adipic acid or sebacic acid, and alicyclic dicarboxylic acids such as cyclohexanedicarboxylic acid.

The other diol that can be used has a molecular weight of not more than 300, and examples of preferred diols are aliphatic glycols such as ethylene glycol, neopentyl glycol or hexamethylene glycol, alicyclic glycols such as cyclohexane dimethanol, or aromatic glycols such as 2,2-bis (4-hydroxyphenyl) propane.

The aliphatic polyester (II) used in this invention is derived from an acide component more than 70 mole% of which consists of an aliphatic dicarboxylic acid or aliphatic hydroxycarboxylic acid, and an aliphatic glycol containing 2 to 10 carbon atoms as a diol component. The aliphatic polyester may further contain less than 30 mole% of an aromatic carboxylic acid of aromatic glycol.

Examples of preferred aliphatic dicarboxylic acids are those containing 2 to 12 carbon atoms, such as adipic acids, sebacic acid, or cyclohexanedicarboxylic acid. Examples of preferred aliphatic glycols are ethylene glycol, 1,3-propylene glycol, 1,4-butanediol, 1,6-hexanediol, neopentyl glycol, and cylohexane dimethanol.

As the aliphatic hydroxycarboxylic acid, $\epsilon$-hydroxycaproic acid is preferred.

The aromatic polyester (I) and the aliphatic polyester (II) may have less than 30 mole%, based on the diol component, and less than 50% by weight, based on the entire constituent components, of a poly(alkylene oxide) glycol copolymerized therewith. In other words, the aromatic polyester (I) and the aliphatic polyeste (II) may be those in which a part of the diol component is replaced by less than 30 mole%, based on the diol component, of a poly(alkylene oxide) glycol.

The poly(alkylene oxide) glycol used for this purpose is a polymer of an alkylene oxide containing 2 to 10 carbon atoms which has an average molecular weight of not more than 5,000, preferably 500 to 5,000. Examples of the poly(alkylene oxide) glycol are poly(ehtylene oxide) glycol, poly(trimethylene oxide) glycol, poly(tetramethylene oxide) glycol, poly(pentamethylene oxide) glycol, poly(hexamethylene oxide) glycol, poly(heptamethylene oxide) glycol, poly(octamethylene oxide) glycol, poly(nonamethylene oxide) glycol, poly(decamethylene oxide) glycol, and $C_1$–$C_3$ alkyl-substituted derivatives of these.

The poly(alkylene oxide) glycol may also be used in the form of a copolymer such as a random copolymer or block copolymer. A typical example is poly(ethylene oxidetetramethylene oxide) copolymer.

Of these polly(alkylene oxide) glycol, poly(tetramethylene oxide) glycol is especially preferred.

When the proportion of the poly(alkylene oxide) glycol to be copolymerized exceeds 50% by weight, the light stability of the resulting copolymer is markedly deteriorated.

The block melt-copolymerization reaction can be quickened by using an aromatic polyester (I) and/or an aliphatic polyester (II) having the poly(alkylene oxide) glycol copolymerized therewith, and a block copolyester elastomer having a higher softening point and better resistance to hydrolysis, oxidation, light and heat than polyester elastomers of the same hardness. Such an effect becomes more remarkable when a polyester having copolymerized therewith not more than 40% by weight, preferably 10 to 40% by weight, of the poly(alkylene oxide) glycol is used.

Furthermore, the aromatic polyester (I) and the aliphatic polyester (II) may be those in which a branching agent has been reacted together, that is, those having in the molecule a unit derived from the branching agent. The branching agent means an aliphatic, alicyclic or aromatic compound containing 3 to 6 ester-forming functional groups in the molecule.

Each of the aromatic polyester (I) and the aliphatic polyester (II) may contain the branching agent unit in an amount of up to 5 mole% based on the acid component of each of the polyesters.

Examples of the ester-forming functional groups which the branching agent contains are a hydroxyl group, a carboxyl group, the —OCOR group group in which R is a monovalent organic group, the —COOR' group in which R' is a monovalent organic group, and the —COX group in which X is a halogen atom. Preferably, the branching agent is a compound having a molecular weight of not more than 1,000. Examples of the branching agent that can be used in this invention include pentaerythritol, dipentaerythritol, glycerol, sorbitol, trimethylol ethane, trimethylol propane, trimethylol butane, 1,3,5-trimethylol benzene, 1,3,5-triethylol benzene, 1,3,5-tributylol benzene, 1,2,6-hexanetriol, and 2,2,6,6-tetramethylol cyclohexanol, and ester-forming derivatives of these, for example, lower fatty acid ester; and hemimellitic acid, trimellitic acid, trimesic acid, prehnitic acid, mellophanic acid, promellitic acid, 5-hydroxyisophthalic acid, 2,5-dihydroxyterephthalic acid, and 2,5-dihydroxyisophthalic acid, and ester-forming derivatives of these, for example, lower alkyl esters or acid halides. When the amount of the branching agent is too large, the elongation of the resultant polymer is reduced exceedingly. This not only impairs the inherent properties of the polymer as an elastomer, but also causes a tendency to gellation. Accordingly, it is recommended that the resulting block copolyester contain up to 6 mole%, based on the acid component, of a unit derived from the branching agent. The preferred amount of the branching agent if 0.04 to 3 mole%, and more preferably, it is 0.04 to 2 mole%.

Block copolyesters containing a unit derived from the branching agent in the above proportion have especially superior elasticity recovery, and the use of the branching agent brings about an effect of shortening the reaction time.

The aromatic polyester (I) and the aliphatic polyester (II) described above can be easily prepared by methods known per se, for example, by a direct esterification process wherein the above-described acid is directly reacted with the glycol, an ester-interchange process wherein an esterforming derivative of the above acid, for example, its lower alkyl ester such as its methyl or ehyl ester, its substituted aliphatic ester such as its 2-hydroxyethyl ester, its aryl ester such as its phenyl ester, its carbonic acid ester, or its acid halide, is reacted with the glycol, or a process wherein the acid and a monocarboxylic acid ester of the glycol are used.

The polyester containing a hydroxycarboxylic acid component as a recurring unit can be prepared by a known method using a hydroxycarboxylic acid, its alkyl ester, or a lactone such as ε-caprolactone as a raw material.

According to the process of this invention, the aromatic polyester (I) and the aliphatic polyester (II) are reacted in the molten state to form a block-copolymerized aromatic polyester-aliphatic polyester elastomer. These polyesters (I) and (II) should have a reduced viscosity of at least 0.4, preferably at least 0.5, and especially preferably at least 0.7 but below 2.0. The reduced specific viscosity is measured in an orthochlorophenol solvent at 35° C. in a polymer concentration of 1.2 g/100 ml.

A method for preparing a block copolymer consisting of a polylactone as a soft segment and an aromatic polyester as a hard segment has been known which comprises reacting a lactone such as ε-caprolactone with an aromatic polyester. This method is not suitable for the production of a block copolyester elastomer having a high softening point which is intended in the present invention. The process of the present invention does include an embodiment of preparing a polyactone by polymerizing a lactone such as ε-caprolactone and then reacting the polylactone with an aromatic polyester, but the resulting block copolyester has a higher softening point than a block copolyester which is obtained by reacting the above lactone with the aromatic polyester. This point will become apparent from the following Examples and Comparative Examples.

In the reaction of the aromatic polyester (I) and the aliphatic polyester (II) in the molten state, the aliphatic polyester (II) as a soft segment is preferably an aliphatic polyester which is soft and transparent at 0° C. The use of such a specific aliphatic polyester results in an improvement in the transparency of the block copolyester elastomer to be obtained.

Most of aliphatic polyesters prepared from one kind each of the aliphatic dicarboxylic acids and the glycols exemplified hereinabove with regard to the aliphatic polyester (II), or aliphatic polyesters derived from one kind of aliphatic hydroxycarboxylic acids usually have a low glass transition point, but is crystalline and non-transparent at 0° C. However, by using at least two kinds of the dicarboxylic acids and the glycols, aliphatic copolyesters having transparency can be obtained. The same aromatic dicarboxylic acids and aromatic diols can also be used as a comonomer. For example, an aliphatic polyester containing isophthalic acid as a copolymer component has increased compatibility with the aromatic polyester, and when using this aliphatic polyester, the above reaction in the molten state becomes faster, and the resulting block copolymer is transparent.

Examples of aliphatic polyesters suitable for giving block copolyester elastomers of improved transparency in accordance with this invention are copolyesters derived from at least one aliphatic dicarboxylic acid selected from the group consisting of adipic acid, sebacic acid, azelaic acid and decanedicarboxylic acid, at least one glycol selected from the group consisting of ethylene glycol, trimethylene glycol, tetramethylene glycol and hexamethylene glycol, and less than 30 mole% of isophthalic acid. These aliphatic copolyesters are soft and transparent at 0° C.

In the block-copolymerization reaction in accordance with this invention, the aromatic polyester (I) and the aliphatic polyester (II) are used in a weight ratio [(I)/(II)] of 90/10 to 20/80, preferably 60/40 to 25/75. When the weight ratio is outside this range, copolyesters having good elasticity cannot be obtained even when the block copolymerization has proceeded satisfactorily.

The reaction time is not particularly restricted, but generally, the block copolymerization substantially ends in 5 to 180 minutes. When the reaction is continued for too long a time,, random copolymerization proceeds considerably, and block copolyesters cannot be obtained. Accordingly, it is necessary to ascertain the point at which the block copolymerization reaction substantially ends. This can be done by sampling the polymer from the reaction system during the reaction, and examining the elasticity recovery of the sampled specimens. The elasticity recovery can be determined by stretching 20% a No. 3 dumbbell test specimen molded from the sampled polymer in accordance with JIS-6301, at a constant rate, relaxing it for 5 minutes, and then measuring the ratio of recovering of stretch. In the present invention, the terminal point of the block copolymerization is defined as one at which the elasticity recovery of the sampled polymer so measured is at least 50%.

When the reaction proceeds and the block copolymerization has reached its maximum extent, the elastic recovery of the the polymer, as defined above, is at least 5%. When the reaction further proceeds and there is a marked occurrence of random copolymerization, the elasticity recovery becomes smaller than 50%. This fact led to the discovery that the elasticity recovery can be a criterion for ascertaining the point at which the block copolymerization of the polymer has reached a maximum extent.

Furthermore, it has also been found that the point at which the block copolymerization reaches a maximum extent substantially corresponds with the time at which the reaction mixture becomes transparent. For partical purposes, therefore, the time at which the reaction mixture becomes transparent is also effective for ascertaining the time at which the block copolymerization reaches a maximum extent. These points agree to the time at which the block copolymerization ends substantially.

We have found that polymers having such an elasticity recovery become block copolyester elastomers having good elasticity.

Preferably, the reaction is accordance with this invention is carried out in the presence of a catalyst, especially a titanium-type catalyst. The use of the catalyst causes the reaction to proceed smoothly. Furthermore, as will be described in detail hereinbelow, the titanium-type catalyst has the advantage that its activity can be easily destroyed or inhibited so as to prevent or inhibit random copolymerization.

Suitable titanium-type catalysts include for example, titanic acid esters, neutralized products thereof, magnesium hexaalkoxy hydrogen titanates, titanyl oxalates, titanium halides, hydrolyzed products of titanium halides, titanium hydroxide, and titanium oxide hydrate.

Examples of preferred titanium-type catalysts are alkyl titanates such as tetramethyl titanate, tetraethyl titanate, tetrapropyl titanate or tetrabutyl titanate, neutralization products of these, magnesium hexaalkoxy hydrogen titanates such as magnesium hexabutoxy hydrogen titanate, titanyl oxalate, calcium titanyl oxalate, titanium tetrachloride, a reaction product formed between titanium tetrachloride and hexanediol, and a reaction product formed between titanium tetrachloride and water.

The amount of the titanium-type catalyst to be used is about 0.001 to 0.5 mole%, preferably 0.003 to 0.1 mole%, based on the entire recurring units of the polyesters (I) and (II).

When a titanium-type catalyst is desired to be present in the reaction system, it is the usual practice to use the aromatic polyester (I) and/or the aliphatic polyester (II) prepared by using the titanium-type catalyst and still containing it. If desired, however, a fresh supply of the titanium-type catalyst may be added to the reaction system during the reaction.

The temperature at which the aromatic polyester (I) and the aliphatic polyester (II) are block copolymerized in the molten state is any point above the melting point of the polyester. Usually, it is at least 200° C., preferably at least 230° C., more preferably not more than 300° C., and especially preferably at least 230° C. but below 270° C. When the reaction is carried out at too high a temperature, the reaction mixture is rapidly led to a random copolymer, and it becomes difficult to obtain the intended elastomer. On the other hand, when the temperature is low, long periods of time are required for the reaction.

The melt-mixing for block copolymerization is preferably done in a inert atmosphere which is held either at an elevated, reduced or atmospheric pressure, and the block copolymerization reaction can be performed by a continuous method, a batchwise method, or otherwise.

When the block copolymerization ends substantially, a phosphorus compound for deactivating the titanium-type catalyst or inhibiting its activity is desirably added to the reaction sytem. This enables the prevention or inhibition of the random copolymerization of the block copolymer.

The phosphorus compund is expressed by the general formula

wherein $R_1$ and $R_2$, identical to, or different form, each other, represent a hydrogen atom, an alkyl, cycloalkyl, aralkyl or aryl group containing not more than 20 carbon atom, or $OR_3$ in which $R_3$ is represents a metal, ammonium or, independently of $R_1$, the same group or atom as $R_1$.

Examples of preferred phosphours compound are inorganic acids such as orthophosphoric acid, phosphorous acid or hydpophosphorous acid; phosphinic acids such as methylphosphinic acid, ethylphosphinic acid, isobutylphosphinic acid, benzylphosphinic acid, phenylphosphinic acid, cyclohexylphosphinic acid, or 4-methylphenylphosphinic acid; phosphonic acids such as methylphosphonic acid, ethylphosphonic acid, isopropylphosphonic acid, isobutylphosphonic acid, benzylphosphonic acid, phenylphosphonic acid, cyclohexylphosphonic acid, or 4-methylphenylphosphonic acid; partial $C_{1-20}$ alkyl, cycloalkyl, aryl or aralkyl esters (e.g., methyl, ethyl, propyl, cyclohexyl, phenyl or benzyl esters) of these acids; partial metal salts of these acids with metals of Groups I and II of the periodic table such as sodium, potassium, calcium or magnesium; and partial ammonium salts of these acids.

Phosphorus compounds in the form of oxyacid have especially great effects even when used in small amounts, and are therefore especially preferred. Since such a phosphorus compound is used in the molten state, those having a high boiling point and a decomposition point are preferred. These phosphorus compounds are used also in the form of a mixture. The amount of the phosphorus compound to be added is such that at least 0.5, preferably at least 0.8, more preferably at least 1, phosphorus atom is used per titanium atom of the titanium catalyst. The phosphorus compound may be added all at once or portionwise.

Mixing of the reaction product after substantial termination of the block copolymerization, with the phosphorus compound can be completed generally within very short periods of time although it depends on the method of mixing. Preferably the mixing is carried out within about 5 to 90 minutes, especially within 90 minutes, in order to inhibit undesirable side-reactions and to perform the operation economically. The deactivation of the catalyst or the inhibitions of its activity can be performed either continuously or batchwise. For example, it can be performed by a method in which a block copolymer obtained by melt-mixing and the block-copolymerizing the aromatic polyester (I) and the aliphatic polyester (II) is withdrawn from the reactor, the phosphorus compound is added to the product, and they are mixed through a extruder to deactivate the titaniumtype catalyst or inhibit its activity. When the block copolymerization reaction is carried out batchwise, the phosphorus compound may be added directly to the block copolymerization product in the reactor to deactivate the titanium catalyst or inhibit its activity, and then the product is withdrawn.

A method has been known to inhibit or prevent random copolymerization by adding a phosphorus compound during the preparation of block copolyesters (Japanese Patent Publication No. 35,500/71 and U.S. Pat. No. 2,623,031).

Our investigations, however, show that the effect of the addition of phosphorus compounds to inhibit or prevent random copolymerization is greatly affected by a catalyst present in the reaction system, and that when the catalyst is anitmony trioxide usually employed in the preparation of polyethylene terephthalate, the addition of phosphorus compounds is virtually unable to inhibit or prevent random copolymerization, and when it is a titanium compound such as a titanic acid ester, the random copolymerization can be inhibited or prevented markedly by the addition of phosphorus compounds. The phosphorus compounds serve the deactivate the titanium catalyst in the reaction system or inhibit its activity substantially, and have an effect of stopping or inhibiting random copolymerization to a maximum extent after the block copolymerization has proceeded adequately. In the present invention, therefore, the use of a titanium-type catalyst not only causes the block copolymerization reaction to proceed smoothly, but permits the catalyst to be deactivated very easily by adding the phosphorus compound so as to inhibit and stop the random copolymerization sufficiently even after the reaction product has undergone a thermal history after the completion of the desired block copolymerization.

This is an advantage of using titanium-type catalysts in the process of this invention, and offers an industrial significance in that stable products can be obtained by usng the block copolyester prepared by the process of this invention.

When, for example, an antimony trioxide catalyst is used instead of the titanium catalyst, it is virtually impossible to deactivate it or inhibit its activity by adding the phosphorus compound. Accordingly, products having stable properties are extremely difficult to obtain from a block copolyester prepared by using the antimony trioxide catalyst because the block copolymerization proceeds to various extents according to differences in history.

For the above reason, it is preferred to perform the reaction of the aromatic polyester (I) and the aliphatic polyester (II) in the molten state in the presence of a titanium-type catalyst, and not to use a catalyst which cannot be deactivated by the addition of a phosphorus compound (for example, antimony oxide). However, it have been found that even when a catalyst incapable of being deactivated is present, for example in the case of using an aromatic or aliphatic polyester prepared by using antimony trioxide as a catalyst, random copolymerization can be substantially prevented or inhibited by adding a titanium-type catalyst in the above-specified range. The use of the titanium catalyst in an amount of at least about 50% based on the amount of the active ingredient of the catalyst present in the polymerization system.

Another method recommendable for preventing the random copolymerization of the block copolyester comprises adding and reacting at least one of the following compounds after the block copolymerization has ended substantially.

Diaryl dicarboxylates of the following formula $$AOOC-X_n-COOB \qquad (A)$$

wherein $n$ is 0 or 1, X is a divalent organic group, and A and B represent a monovalent aryl group containing 6 to 20 carbon atoms and being free from an ester-forming functional group, A and B being identical or different;

carbonic acid esters of the following formula

(B)

wherein $R_4$ and $R_5$ represent an aryl group containing no ester-forming functional group, and are identical or different; and ortho-carbonate compounds of the following formula

wherein $R_6$, $R_7$, $R_8$ and $R_9$ are identical or different, and represent a monovalent aryl group containing no ester-forming functional group.

The diallyl dicarboxylate of formula (A) may, for example, be those of formula (A) in which X is divalent aromatic group such as phenylene, naphthylene, diphenylene,

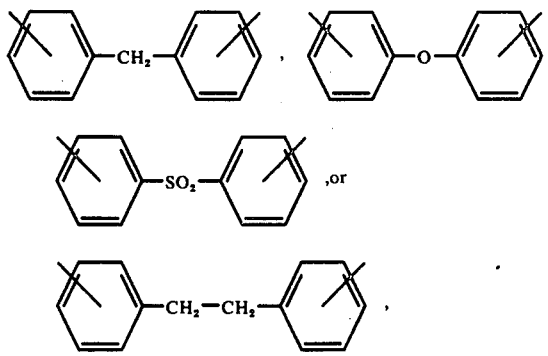

such a divalent aromatic group in which a part or whole of the hydrogen atoms is substituted by halogen, a divalent aliphatic group such as ethylene, pentylene, or neopentylene, or a divalent aralkylene group such as xylylene or haloxylylene, and A and B represent an aryl group such as phenyl, phenylphenyl or naphthyl, a substituted aryl group such as tolyl, xylenyl, methylnaphthyl or halogen-substituted naphthyl, or phenoxyphenyl.

Specific examples of diaryl dicarboxylates include diphenyl terephthalate, ditolyl terephthalate, phenylphenyl tolyl terephthalate, diphenoxyphenyl terephthalate, diphenyl isophthalate, diphenyl phthalate, phenyl naphthyl phthalate, diphenyl naphthalenedicarboxylate, phenoxyphenylphenyl diphenylmethane dicarboxylate, diphenyldiphenylsulfone dicarboxylate, di(chlorophenyl) oxalate, diphenyl succinate, diphenyl adipate, dinaphthyl sebacate, and diphenyl oxalate.

The carbonic acid ester of formula (B) may, for example, be those of formula (B) in which $R_4$ and $R_5$ represent a phenyl, $\alpha$-naphthyl, $\beta$-naphthyl, p-chlorophenyl, p-phenylphenyl, p-toluyl, o-toluyl, p-octylphenyl or 2,6- dimethylphenyl group. Specific examples of the carbonate are diphenyl carbonate, dinaphthyl carbonate, ditolyl carbonate, and dichlorophenyl carbonate.

The ortho-carbonate compound of formula (C) may, for example, be those of formula (C) in which $R_6$, $R_7$, $R_8$ and $R_9$ represent an aryl group such as phenyl, naphthyl, or diphenyl optionally substituted at a part or whole of the aromatic nucleus by another atom or substituent. Specific examples of such a compound are tetraphenyl ortho-carbonate, tetranaphthyl ortho-carbonate, tetratolyl ortho-carbonate, and tetrachlorophenyl ortho-carbonate.

The suitable amount of such a compound to be used in the process of this invention is 0.5 to 5 mole%, preferably 0.5 to 3 mole%.

The addition of the above compound may be performed at a time or portionwise. According to the process of this invention, the reaction is carried out at reduced pressure after adding such a compound. When the reaction is not carried out at reduced pressure, an effect of inhibiting random copolymerization is small.

Furthermore, as is clear from the nature of the above compound, phenols are sometimes formed in the reaction system. It has been found that when phenols occur in the reaction system, the resulting polymer becomes susceptible to yellowing. Such a coloration can be prevented by adjusting the amount of such phenols to less than 0.8 mole%, especially less than 0.6 mole%, based on the total amount of the acid component.

The performance of the reaction at reduced pressure after adding such a compound is effective not only for inhibiting random copolymerization, but also for removing fragments resulting from such an additive.

In the present invention, other additives, such as heat stabilizers, oxidation stabilizers, light stabilizers, ultraviolet absorbers, fluorescent bleaching agents, delusterants, slipping agents, antistatic agents, crystal nuclearing agents, fire retardants, fire retarding assistants, mold-proofing agents, pigments, reinforcing glass fibers, or fillers, can be added simultaneously with the addition of the phosphorus compound and the compounds of formula (A), (B) or (C) or at different times. These additives can of course be incorporated during the manufacture of the aromatic polyester (I) and/or the aliphatic polyester (II). It is also possible to use a compound which has at least two of these functions. Oher polymers, such as polystyrene, polyethylene, various rubbers, or polycarbonate, can also be mixed with the block copolyesters in accordance with this invention.

The resulting block copolyester has a softening point of at least 120° C., preferably at least 140° C., more preferably at least 160° C. When the corresponding complete random copolymer has a softening point lower than 190° C., the block copolyesters of this invention have a softening point at least 10° C. higher than the softening point of the random copolymer. The softening point is determined according to the types of the aromatic polyesters and the aliphatic polyesters used, the ratio of these polyesters used, and the extent of the reaction.

The degree of polymerization of the resulting block copolyester can be increased by further polymerizing it in the solid phase before adding the phosphorus compound or before or after adding the compound of formula (A), (B) or (C). The solid-phase polymerization can be accomplished by cooling the resulting block copolyester, if desired making it into crystallized chips or powders, and treating the polymer in vacuum or in a stream of an inert gas at a temperature which is lower than the temperature of crystals by 5° to 40° C., preferably 5° to 20° C. Preferably, the chips have a size such that their surface area per unit weight is larger than that of a cube with one side measuring 5 mm. The temperature for the solid-phase polymerization is lower than the melting point of the crystals by 5° to 40° C., usually 160° to 210° C., preferably 180° to 210° C. The solid-phase polymerization can be performed by, for example, heating the polymer in vacuum or in a stream of a heated inert gas such as nitrogen. An apparatus of any desired shape, such as a tower, tank, conveyor, or fluidized bed type, can be used for performing the solid phase polymerization.

The time required for the solid phase polymerization is usually 30 minutes to 24 hours.

When the phosphorus compound is added, the block copolymer and the phosphorus compound are mixed in an extruder after the solid-phase polymerization, thereby to prevent random copolymerization.

The block copolyester elastomers obtained by the process of this invention have very superior properties in elasticity recovery, tensile strength, creep characteristics, or fatigue resistance. Especially, copolyesters prepared by using polytetramethylene terephthalate as the aromatic polyester have a fast rate of crystallization and good moldability, and possess better resistance to hydrolysis than those obtained by using polyethylene terephthalate as the aromatic polyester. Since by using polytetramethylene terephthalate as the aromatic polyester, the melt-mixing reaction can be performed at relatively low temperatures, and thus, the ester-interchange reaction can be easily controlled to form block copolyester elastomers having stable properties.

The block copolyesters obtained by the process of this invention can be used in various applications in the form of tubes, belts or sheets or molded articles obtained by, for example, injection molding.

The following Examples and Comparative Examples illustrate the present invention in greater detail. In these examples, all parts are by weight. The various properties shown in these examples were measured by the following methods.

Reduced viscosity ($\eta sp/c$)

Measured in ortho-chlorophenol at 35° C. with a polymer concentration of 1.2 g/100 ml.

Softening point

Measured by means of a Vicat-type softening point measuring device.

Tensile strength and elongation

The elastomer is injection-molded and test specimens (No. 3 dumbbell shaped in accordance with JIS K-6301) having a thickness of 2 mm are prepared. Indicator lines with a distance of 20 mm therebetween are provided. Each of the specimens is pulled on an Instron universal tester at a pulling speed of 20 cm/min. in an atmosphere held at a temperature of 20° C. and a relative humidity of 65%. The tensile strength and elongation are an average of values calculated in accordance with the following equations.

$$\text{Tensile strength (Kg/cm}^2\text{)} = \frac{\text{Load (Kg) at breakage}}{\text{Gross sectional area (cm}^2\text{) of the test specimen}}$$

$$\text{Elongation (\%)} = \frac{\left(\begin{array}{c}\text{Distance between} \\ \text{the indicator} \\ \text{lines at breakage}\end{array}\right) - \left(\begin{array}{c}\text{Distance be-} \\ \text{tween the in-} \\ \text{dicator lines}\end{array}\right)}{\text{Distance between the indicator lines}} \times 100$$

Tear strength

The elastomer was injection molded, and three test specimens having a thickness of 2.5 mm of the B-type (V-shaped) in accordance with JIS K6301 are prepared. Each of the specimens is pulled on an Instron universal tester under the same conditions as in the measurement of the tensile strength and elongation. The tear strength is an average of values calculated in accordance with the following equation.

$$\text{Tear strength (Kg/cm)} = \frac{\text{Maximum load (Kg)}}{\text{Thickness (cm) of the tese specimen}}$$

Surface hardness

Measured in accordance with ASTM D-2240 (durometer hardness).

Whole light transmittance

Measured by using a Poic sphere method turbidimeter (SEP-TU type). The transmittance of light through air is taken as 100%, and the light transmittance is expressed as the sum total of that of scattered light rays and parallel light rays which pass through a film having a predetermined thickness (mm).

Elasticity recovery

Three test specimens having a thickness of 2 mm (of the No. 3 type in accordance with JIS K-6031) were each stretched 20% at a stretching speed of 20 cm/min. on an Instron universal tester, and relaxed in this state for 5 minutes. Then, the stress is returned to zero. The elasticity recovery is an average of values calculated in accordance with the following equation.

$$\text{Elasticity recovery} = \frac{\left(\begin{array}{c}\text{Elongation} \\ \text{at 20\% stretch}\end{array}\right) - \left(\begin{array}{c}\text{Elongation} \\ \text{at zero stress}\end{array}\right)}{\text{Elongation at 20\% stretch}}$$

Example 1 and Comparative Examples 1 and 2

1. Preparation of Aromatic Polyester

Dimethyl terephthalate (97 parts), 67 parts of tetramethylene glycol and 0.05 part of titanium butoxide were placed in an ester-interchange tank equipped with a rectification column, and gradually heated. Ester interchange reaction was performed so that the temperature at the top of the rectification column was maintained at not more than 65° C., and the resulting methanol was distilled off. The amount of the distillate was 29 parts.

The ester-interchanged melt was transferred to a polymerization tank, allowed to stand for 10 minutes at 240° C., maintained at 20 mmHg for 30 minutes after pressure reduction, and then after gradually reducing the pressure down to 0.6 mmHg, polymerized at 0.6 mmHg. In about 60 minutes after the pressure reached 0.6 mmHg, nitrogen was introduced to elevate the pressure, and the polymer was discharged from the lower part of the polymerization tank. It was cooled and cut to form chips. The chips had a reduced viscosity of 1.42, and softening point of 225° C.

2. Preparation of Aliphatic Polyester

Dimethyl adipate (174 parts), 137 parts of ethylene glycol and 0.1 part of titanium butoxide were placed in a sitrred tank equipped with a rectification column, and heated by a jacket to raise the temperature of the inside of the tank gradually. Ester interchange reaction was carried out so that the temperature of the top of the reactification column was maintained at not more than 65° C., and 64 parts of distillate was collected.

The resulting ester interchanged product was transferred to a polymerization tank, and the temperature of the inside of the polymerization tank was maintained at 240° C., and the ethylene glycol that distilled out was collected over a period of about 30 minutes. The pressure inside the polymerization tank was gradually reduced down to 30 mmHg, and the reaction was performed at this pressure for 40 minutes. Then, the pressure was further reduced, and the reaction was performed for 2 hours at 0.6 mmHg to form a polyester which had a reduced viscosity of 0.90, and a softening point of 75° C.

3. Preparation of Elastomer 50 parts of the aromatic polymer obtained in (1) was mixed with 50 parts of the aliphatic polymer obtained in (2), and the mixture was melted in a vessel in a nitrogen atmosphere at an external temperature of 240° C. In about 15 minutes, there was hardly any mass observed, and in about 45 minutes, the reaction mixture became transparent. The reaction product was withdrawn after a lapse of 60 minutes, and cooled. A period of about 5 minutes was required for the withdrawal. The resulting chips were well mixed, and dried at 100° C. for 4 hours.

The chips were molded using a 3.5-ounce molding machine (a product of Nikko-Ankerwerk, Japan) while maintaining the cylinder temperature and the mold temperature at 210° C. and 60° C., respectively. The various properties of the molded articles were measured, and the results are shown in Table 1.

For comparison, the same procedure as above was carried out except that the above melt-mixing was carried out for 30 minutes (Comparative Example 1), and 3 hours (Comparative Example 2), respectively. The results are also shown in Table 1.

polymer was allowed to stand to crystallize it, and the test specimens were prepared by cutting it.

EXAMPLES 2 to 4

The polyesters obtained in (1) and (2) in Example 1 were melt-mixed at 0.5 mmHg in the proportions shown in Table 2 in the same way as in Example 1. The results obtained are shown in Table 2.

Table 2

| | | Example 2 | Example 3 | Example 4 |
|---|---|---|---|---|
| Conditions for preparation | Amount of polymer (1) (parts) | 33 | 67 | 80 |
| | Amount of polymer (2) (parts) | 67 | 33 | 20 |
| | Melting temperature (° C) | 240 | 250 | 250 |
| | Melt-mixing time (minutes) | 35 | 130 | 300 |
| | The time required until the reaction product became transparent (minutes) | 130 | 120 | 320 |
| Properties of the resulting elastomer | Softing point (° C) | 166 | 220 | 221 |
| | Reduced viscosity ($\eta_{sp/c}$) | 1.24 | 1.35 | 1.29 |
| | Tensile strength (kg/cm$^2$) | 110 | 187 | 330 |
| | Tensile elongation (%) | 820 | 440 | 320 |
| | Elasticity recovery (%) | 85 | 63 | 57 |
| | Tear strength (Kg/cm) | 65 | 130 | 140 |

EXAMPLES 5 to 8

In the same way as in Example 1, (2), various aliphatic polyesters were prepared. Each of these aliphatic polyester was melt-mixed at 240° C. with the aromatic polyester obtained in (1) of Example 1. Block copolyesters shown in Table 3 were obtained. Molded articles were prepared by injection molding of these block copolyesters. The properties of these molded articles are also shown in Table 3.

Table 3

| | Example 5 | Example 6 | Example 7 | Example 8 |
|---|---|---|---|---|
| (Aliphatic polyester) | | | | |
| Acid component | HOOC(CH$_2$)$_4$COOH | HOOC(CH$_2$)$_4$COOH | HOOC(CH$_2$)$_6$COOH | HOOC(CH$_2$)$_2$COOH |
| Glycol component | HO(CH$_2$)$_4$OH | HO(CH$_2$)$_6$OH | HO(CH$_2$)$_2$OH | HO(CH$_2$)$_4$OH |
| $\eta_{sp/c}$ | 0.94 | 1.11 | 1.05 | 0.93 |
| Time required until the reaction product became transparent (minutes) | 75 | 70 | 55 | 45 |
| Melt-mixing time (minutes) | 80 | 75 | 60 | 50 |
| Softening point (° C.) | 212 | 207 | 204 | 210 |
| Tensile strength (Kg/cm$^2$) | 145 | 150 | 140 | 130 |
| Tensile elongation (%) | 600 | 550 | 650 | 450 |
| Tear strength (Kg/cm) | 83 | 90 | 85 | 78 |
| Elasticity recovery (%) | 77 | 72 | 73 | 78 |

Table 1

| | Example 1 | Comparative Example 1 | Comparative Example 2 |
|---|---|---|---|
| Appearance of the reaction product in (3) as cooled | Yellow, non-transparent | Yellow, non-transparent | Reddish yellow, transparent |
| Tensile strength (Kg/cm$^2$) | 170 | 121 | —* |
| Tensile elongation (%) | 600 | 65 | —* |
| Tear strength (Kg/cm) | 91 | 43 | —* |
| Softening point (° C) | 189 | 174 | 118** |
| Elasticity recovery after 20% stretch and 5-minute relaxation | 75 | 41 | —* |

*Molding was impossible, and therefore, the measurement was also impossible.
**Measured after allowing the specimen to stand at room temperature for 24 hours to crystallize it.

Measurement of the Softening Point

The test pieces were prepared by cutting the injection molded articles. In Comparative Example 2, the

EXAMPLE 9 AND COMPARATIVE EXAMPLE 3

The properties of an injection-molded article prepared from a mixture of the same polymer as obtained in (3) of Example 1 and 1% by weight of Irganox 1093 (a heat stabilizer produced by Ciba-Geigy) were compared with those of an injection-molded article prepared from a mixture of a polyeser ester derived from terephthalic acid, tetramethylene glycol and polytetramethylene glycol and containing 45% by weight of the polytetramethylene glycol (average molecular weight 1,500) in the entire polymer and 1% of weight of Irganox 1093 . The results are shown in Table 4.

Table 4

| | Example 9 | Comparative Example 3 (polyether-ester) |
|---|---|---|
| Tensile strength (Kg/cm$^2$) | 160 | 220 |

Table 4-continued

| | Example 9 | Comparative Example 3 (polyether-ester) |
|---|---|---|
| Tensile elongation (%) | 550 | 670 |
| Tear strength (Kg/cm) | 90 | 100 |
| Surface hardness (Shore D) | 45 | 48 |
| Strength retention (%) after 3 days at 165° C. | 71 | The specimen became crumbled, and the measurement was impossible |
| Weight increase (%) after standing in gasoline for 24 hours | 4 | 22 |
| Weight increase (%) after standing in toluene for 24 hours | 19 | 63 |

EXAMPLE 10

20 Parts of the polyester obtained in (1) of Example 1 was mixed with 10 parts of the polyester obtained in (2) of Example 1 with stirring at 250° C. and 0.5 mmHg for 2 hours, and the mixture was discharged into water. The resulting product had a reduced viscosity of 1.15 and a melting point of 218° C.

The polymer was pulverized, and particles having a size of 8 to 12 mesh were collected and allowed to stand for 4 hours at 200° C. and 0.5 mmHg. The resulting polymer had a reduced viscosity of 2.52, a melting point of 210° C. and an elasticity recovery of 70%. The melting point was measured visually at a temperature raising rate of 10° C./minute using a micro melting point measuring device.

The resulting polyester was injection molded. The molded article had a tensile strength of 330 Kg/cm² and a tear strength of 170 Kg/cm.

EXAMPLES 11 to 15

Aromatic polyesters and aliphatic polyesters indicated in Table 5 were prepared in the same way as in (1) and (2) of Example 1. These polyesters were block copolymerized in the molten state in the proportions indicated in Table 5 by the same method as in Example 1, (3), and then polymerized in the solid phase under the conditions shown in Table 5.

The reduced viscosity ($\nu_{sp/c}$) and melting point of the resulting polymers are shown in Table 5.

EXAMPLE 16

1. Preparation of Aromatic Polyester

Dimethyl terephthalate (194 parts), 140 parts of tetramethylene glycol and 0.102 part (0.03 mole% based on the acid component) of butyl titanate were subjected to ester interchange by heating them with stirring in an inert atmosphere. A liquid composed mainoy of methanol which distilled out at a reaction temperature of 200° C. was collected, and when the amount of the methanol distilled out approximately reached the theoretical amount, the pressure of the reaction system was gradually reduced and the temperature was raised to 240° C. Finally, the pressure in the reaction system was reduced to 0.5 mmHg or below, and the polymerization was terminated. Polyethylene terephthalate (designated as polymer A) was obtained which had a reduced viscosity of 1.05 and a softening point of 225.5° C.

2. Preparation of Aliphatic Polyester

Dimethyl adipate (348 parts), 272.8 parts of ethylene glycol and 0.204 part of butyl titanate were treated in the same way as in (1) above to form polyethylene adipate. The polymer had a reduced viscosity of 0.755 and a softening point of 65° C. (The polymer was designated as polymer B.)

3. Preparation of Elastomer

50 Parts of the polymer A and 100 parts of the polymer B were dried, and melt-mixed with stirring at 240° C. and 0.5 mmHg. At the initial stage, the reaction mixture was non-transparent because of phase separation, but in about 50 minutes, turned transparent. At this time, phosphorous acid was added in an amount of 0.1 mole% based on the total acid component of the polymers A and B, and the mixture was stirred in an inert atmosphere at atmospheric pressure for 20 minutes to form block copolyester (designated as polymer C).

The resulting block copolyester was molten in an inert atmosphere at 240° C., and variations in its softening point that occurred were measured. The results are shown in Table 6.

Table 5

| | Starting polyesters | | Block copolyester | | | Solid-phase polymerization conditions | | | Block copolyester after the solid-phase polymerization | |
|---|---|---|---|---|---|---|---|---|---|---|
| Example | Aromatic polyester (parts) | Aliphatic polyester (parts) | $\eta_{sp/c}$ | Melting point (° C) | Elasticity recovery (%) | Temperature (° C.) | Degree of vacuum (mm Hg) | Time (hours) | $\eta_{sp/c}$ | Melting point (° C.) |
| 11 | Polytetramethylene terephthalate (80) | Polyethylene adipate (20) | 1.05 | 221 | 61 | 210 | Atmospheric (N₂ stream) | 8 | 2.21 | 220 |
| 12 | Polytetramethylene terephthalate (50) | Polytetramethylene adipate (50) | 1.20 | 213 | 78 | 200 | 0.5 | 4 | 2.11 | 212 |
| 13 | Polytetramethylene terephthalate (70) | Polyhexamethylene adipate (30) | 1.01 | 220 | 61 | 210 | 0.5 | 4 | 2.06 | 212 |
| 14 | Polytetramethylene terephthalate (70) | Polyethylene sebacate (30) | 1.23 | 218 | 62 | 200 | 0.5 | 4 | 1.97 | 209 |
| 15 | Polytrimethylene terephthalate (70) | Polytetramethylene adipate (30) | 1.27 | 216 | 58 | 200 | 0.5 | 16 | 2.10 | 205 |

Table 6

| Copolyester | Softening point (° C.) |
|---|---|
| Before addition of phosphorous acid | 180° C. |
| Polymer C as withdrawn | 179° C. |
| Polymer C (after 30 minutes at 240° C.) | 179° C. |
| Polymer C (after 60 minutes at 240° C.) | 179° C. |
| Polymer C (after 90 minutes at 240° C.) | 179° C. |

The polyester C was molded in accordance with JIS K-6301 while maintaining the cylinder temperature and the mold temperature at 190° C. and 60° C., respectively. The cooling time was 30 seconds. The resulting molded article had a tensile strength of 102 Kg/cm², a tensile elongation of 760%, a tear strength of 63 Kg/cm, and an elasticity recovery of 79%.

EXAMPLES 17 to 19

50 Parts of the polymer A obtained by the method in Example 16, (1) and 100 parts of the polymer B obtained by the method in Example 16, (2) were block copolymerized in the same way as in Example 16, (3) using the various phosphorus compounds shown in Table 7. When each of the polymers obtained was allowed to stand for 60 minutes at 240° C., its softening point was substantially the same as that immediately after withdrawal from the polymerization vessel, as shown in Table 7.

Table 7

| Example | Phosphorus Compound | Amount of the phosphorus compound as P atom (mole % based on the acid component) | Softening point (° C.) At the time of withdrawal | After 60 minutes at 240° C. |
|---|---|---|---|---|
| 17 | Hypophosphorous acid | 0.05 | 179 | 179 |
| 18 | Phenylphosphonic acid | 0.1 | 178 | 178 |
| 19 | Disodium phosphate | 0.2 | 180 | 179 |

EXAMPLES 20 to 24

1. In the same way as in Example 16, (1), polytetramethylene terephthalate having a reduced viscosity of 1.45 (designated as polymer $A_1$), polytetramethylene terephthalate having a reduced viscosity of 1.10 (designated as polymer $A_2$), polytrimethylene terephthalate having a reduced viscosity of 1.15 (designated as polymer $A_3$), and polyhexamethylene terephthalate having a reduced viscosity of 1.65 (designated as polymer $A_4$) were prepared.

2. In the same way as in Example 16, (2), polytetramethylene adipate having a reduced viscosity of 0.95 (designated as polymer $B_1$), polyhexamethylene adipate having a reduced viscosity of 0.85 (designated as polymer $B_2$), and polyethylene adipate having a reduced viscosity of 1.05 (designated as polymer $B_3$) were prepared.

3. These polymers were block-copolymerized in the same way as in Example 16, (3) in the proportions shown in Table 8 using the phosphorus compounds shown in Table 8.

The softening points of the resulting block copolyesters immediately after withdrawal from the polymerization vessel and after 60 minutes at 240° C. and their tensile strength were measured, and the results are shown in Table 8.

Table 8

| Example | Polymer A | Polymer B | A/B (parts) | Mole % of the P compound based on the acid component | Softening point As withdrawn | Softening point After 1 hour at 240° C. | Tensile strength (Kg/cm²) |
|---|---|---|---|---|---|---|---|
| 20 | $A_1$ | $B_1$ | 50/50 | Phosphorous acid (0.1) | 216 | 216 | 140 |
| 21 | $A_1$ | $B_2$ | 50/50 | Phosphoric acid (0.05) | 218 | 218 | 135 |
| 22 | $A_3$ | $B_3$ | 50/50 | Phosphorous acid (0.2) | 219 | 219 | 145 |
| 23 | $A_4$ | $B_4$ | 33/66 | Phosphorous acid (0.2) | 110 | 110 | 95 |
| 24 | $A_2$ | $B_4$ | 33/66 | Phosphorous acid (0.1) | 227 | 227 | 210 |

EXAMPLE 25

1. Preparation of Aromatic Polyester

A reactor equipped with a rectification column was charged with 97 parts of dimethyl terephthalate, 90 parts of tetramethylene glycol and 0.051 part of tetrabutyl titanate. Ester interchange was carried out at atmospheric pressure while raising the temperature of the inside of the reactor to 160° to 220° C. When 95% of the theoretical amount of methanol distilled out, the reaction was stopped. The contents of the reactor were transferred to a polycondensation reactor, and polycondensed under high vacuum at a temperature of 240° C. while gradually increasing the degree of vacuum. In about 3.5 hours, a polymer having a reduced viscosity of 1.12 was obtained. This polymer was designated as polyester A.

2. Preparation of Aliphatic Polyester

The same procedure as in the synthesis of the polyester (A) above was repeated except that 87 parts of dimethyl adipate, 90 parts of tetramethylene glycol and 0.051 part of tetrabutyl titanate were used, and the polycondensation time was changed to 5 hours. A polymer having a reduced viscosity of 1.05 was obtained. This polymer was designated as polyester B.

3. Preparation of Block Copolyester

25 Parts of the polyester A was fed into a polycondensation reactor, and melted at 250° C. under atmospheric pressure, and 50 parts of the polyester B separately melted was added. The mixture was stirred at 250° C. under high vacuum for 40 minutes, when the molten polymer became substantially transparent. At this stage, the pressure of the reaction system was returned to atmospheric pressure, and 1.90 parts of diphenyl terephthalate was added. Again, the degree of vacuum was increased gradually, and the mixture was stirred under high vacuum for 30 minutes. Before the addition of the diphenyl terephthalate, the polymer had a softening point of 202° C. After reaction under high vacuum for 30 minutes following the addition, the softening point of the polymer became 178° C. The polymer had a tensile strength of 135 Kg/cm$^2$ and an elasticity recovery of 82%.

EXAMPLES 26 and 27

The same procedure as in Example 21 was repeated except that 1.3 parts of diphenyl carbonate (Example 26) or 2.1 parts of tetraphenyl orthocarbonate (Example 27) was added instead of the diphenyl terephthalate. When the reaction was carried out for 30 minutes under high vacuum after the addition of the above random-copolymerization inhibitor, the polymer had a softening point of 180° C. (Example 26), and 175° C. (Example 27), respectively.

EXAMPLE 28

1. Preparation of Aromatic Polyester

An ester-interchange reaction tank equipped with a rectification column was charged with 97 parts of dimethyl terephthalate, 67 parts of tetramethylene glycol, and 0.05 part of titanium butoxide, and the temperature of the inside of the reactor was gradually raised. Ester interchange was carried out so that the temperature of the top of the rectification column was maintained at not more than 65° C. The resulting methanol was distilled off. The amount of the resultant distillate was 29 parts.

The ester-interchanged molten product was transferred to a polymerization vessel. After allowing it to stand for 10 minutes at 240° C., the pressure of the inside of the reaction vessel was reduced, and the molten product was maintained at 20 mmHg for 30 minutes. Then, the pressure was reduced gradually down to 0.6 mmHg, and at this pressure, the reaction was continued. In about 60 minutes after the pressure was reduced to 0.6 mmHg, nitrogen was introduced to elevate the pressure. The polymer was discharged from the lower part of the polymerization vessel, cooled, and cut to form chips having a reduced viscosity of 1.42.

2. Preparation of Aliphatic Polyester

A stirred vessel equipped with a rectification column was charged with 174 parts of dimethyl adipate, 137 parts of ethylene glycol, 0.1 part of titanium tetrabutoxide and 0.54 part of pentaerythritol, and heated by a jacket. The temperature of the inside of the vessel was gradually raised, and these compounds were subjected to ester interchange so that the temperature of the top of the rectification column was maintained at not more than 65° C. 81 Parts of a distillate was collected. The resulting ester-interchanged product was transferred to a polymerization vessel, and the temperature of the inside of the polymerization vessel was maintained at 240° C. Ethylene glycol which distilled off was cooled over a period of about 30 minutes. The degree of vacuum was increased gradually to 30 mmHg, and the reaction was performed at this pressure for 40 minutes. Then, the degree of vacuum was further increased, and the reaction was performed at 0.6 mmHg for 2 hours to form a polyester having a reduced viscosity of 1.01.

3. Preparation of Block Copolymer

10 Parts of the aromatic polyester obtained in (1) above and 10 parts of the aliphatic polyester obtained in (2) above in chip form were mixed, and allowed to stand for about 30 minutes at an external temperature of 250° C. Since almost all the polymers were melted, the mixture began to be stirred. In 20 minutes after the initiation of stirring, the reaction mixture became transparent. At this time, 0.1 part of trimethyl phosphite was added to the reaction mixture, and the mixture was stirred for 5 minutes. Then, the mixture was taken out into water. The resulting block copolyester had a tensile strength of 158 Kg/cm$^2$, a tear strength of 79 Kg/cm, and a reduced viscosity of 1.39. Also, after being stretched 50% and relaxed for 5 minutes, the polymer had a stress relaxation ratio of 24%, an elasticity recovery of 74%, and a stress at 50% stretch of 102 Kg/cm$^2$.

EXAMPLE 29

1. Preparation of Aromatic Polyester

97 Parts of dimethyl terephthalate, 80 parts of trimethylene glycol and 0.27 parts of pentaerythritol were subjected to an ester-interchange reaction in the presence of 0.05 part of titanium tetrabutoxide, and 31 parts of a distillate was collected. The product was transferred to a polymerization vessel held at 250° C. Ten minutes later, the pressure was gradually reduced, and the reaction was performed at 30 mmHg for 40 minutes. The pressure was further reduced, and the polymerization was continued at 0.5 mmHg for 180 minutes. The resulting polymer was discharged into water, and cut to form chips of poly(trimethylene terephthalate) having a reduced viscosity of 0.93.

2. Preparation of Block Copolyester

Ten parts of the aromatic polyester obtained by the method (1) was blended in chip form with 10 part of the aliphatic polyester obtained by the method of Example 28, (2), and they were reacted at 250° C. in the same way as in Example 28. The mixture was stirred for about 45 minutes, when it became transparent. At this time, 0.1 part of trimethyl phosphite was added, and the mixture was stirred for 5 minutes. The resulting block copolyester was withdrawn. An injection-molded article was prepared from the resulting polymer, and its properties were measured. It was found to have a tensile strength of 110 Kg/cm$^2$, a tear strength of 76 Kg/cm, and a reduced viscosity of 1.15. After being stretched 50% and relaxed for 5 minutes, it had a stress relaxation ratio of 25%, and elasticity recovery of 72%, and a stress at 50% stretch of 110 Kg/cm$^2$.

EXAMPLES 30 TO 34 AND COMPARATIVE EXAMPLES 4 AND 5

1. Preparation of Aromatic Polyester

In the method of Example 28, (1), 1,1,1-trimethylol propane or trimethyl trimellitate was added in various amounts to form aromatic polyesters.

2. Aliphatic Polyester

The aliphatic polyester prepared in Example 28, (2) was used.

3. Preparation of Block Copolyester

Ten parts of the aromatic polyester obtained in (1) above and 10 parts of the aliphatic polyester in (2) above were melt-reacted at 240° C. for 1 hour in the same way as in Example 28, (3). An injection-molded article was prepared from each of the block copolyester, and its stress relaxation ratio and elasticity recovery after 50% stretch and 5-minute relaxation were measured. The results are shown in Table 9.

Table 9

| Run No. | Amount of the branching agent (mole % based on dimethyl terephthalate) contained in the aromatic polyester | | After 50% stretch and 5-minute relaxation | |
|---|---|---|---|---|
| | 1,1,1-trimethylol propane | Trimethyl trimellitate | Stress relaxation ratio (%) | Elasticity recovery (%) |
| Example 30 | 0.1 | 0 | 25 | 72 |
| Example 31 | 0.5 | 0 | 24 | 74 |
| Example 32 | 1.0 | 0 | 23 | 74 |
| Comparative Example 4 | 2.7 | 0 | Gelled | |
| Example 33 | 0 | 0.1 | 24 | 73 |
| Example 34 | 0 | 1.0 | 24 | 75 |
| Comparative Example 5 | 0 | 4.0 | Gelled | |

EXAMPLE 35

1. Preparation of Aromatic Polyester

Dimethyl terephthalate (155 parts), 39 parts (10 mole% based on the total component) of dimethylisophthalate, 190 parts of tetramethylene glycol and 0.10 part of butyl titanate were subjected to an ester-interchange reaction with stirring in an inert gaseous atmosphere. The reaction was continued while distilling off a liquid consisting mainly of methanol which occurred at 200° C. When the amount of methanol distilled out reached about 95% of the theoretical amount, the pressure of the reaction system was gradually reduced, and heated up to 240° C. Finally, the polymerization was carried out at a pressure of 0.5 mmHg or below. The resulting aromatic polyester had a reduced viscosity of 1.42. The polyester was designated as polymer A.

2. Preparation of Aliphatic Polyester

Dimethyl adipate (240 parts), 116 parts (15 mole% based on the total component) of dimethyl isophthalate, 396 parts of tetramethylene glycol and 0.20 parts of butyl titanate were reacted in the same way as in (1) above to afford an aliphatic polyester having a reduced viscosity of 1.23. When it was cooled to 0° C., it remained transparent, very viscous, and sirupy. The polymer was designated as polymer B.

3. Preparation of Block Copolyester

40 Parts of the polymer A and 60 parts of the polymer B were dried, and melted with stirring at 240° C. and 0.5 mmHg or less. The reaction system, immediately after the melting of the polymer, was non-transparent, but became transparent in about 20 minutes. The reaction was continued for an additional 5 minutes, and the polymer was withdrawn and quenched.

The resulting polymer was molded into a film having a thickness of 0.2 mm. The film was transparent (a transmittance of 73% under parallel light rays). When it was immersed for 1 hour in boiling water, it became non-transparent immediately after being taken out. But when it was dried, it again became transparent. After drying for 1 hour in a dryer at 110° C., the transparency of the film was the same as that before immersion in boiling water.

On the other hand, the same reaction as above was carried out, and after the reaction mixture became transparent, the reaction was continued for an additional 5 minutes, and 0.10 part of phosphorous acid was added. Then, the polymer was withdrawn from the polymerization vessel.

The resulting polymer was injection-molded at a cylinder temperature of 180° C. and a mold temperature of 40° C. to form dumbbell (No. 3) specimens in accordance with JIS 6301. The specimens were subjected to a tensile test, and also stretched 20% followed by relaxation for 5 minutes to determine their elasticity recovery. The molded article was found to have a tensile strength of 135 Kg/cm$^2$, an elongation of 420% and an elasticity recovery of 77%. It also had a softening point of 173° C. as measured by a needle-penetration method.

EXAMPLES 36 TO 38

In the preparation of the polymers A and B in Example 35, the same procedure was repeated except that dimethyl terephthalate or dimethyl adipate was used instead of the dimethyl isophthalate. The resulting polymers were designated as polymer A', and polymer B', respectively.

The same block copolymerization as in Example 1 was carried out except that polymer A' or polymer B' was used instead of the polymer A or polymer B.

A film having a thickness of 0.2 mm was prepared from each of the block copolymers obtained. The parallel light ray transmittance of each of the block copolymers is shown in Table 10.

Table 10

| Run No. | Aromatic polyester | | Aliphatic polyester | | Transmittance of the block copolymer under parallel light rays (%) |
|---|---|---|---|---|---|
| | Type | Amount (parts) | Type | Amount (parts) | |
| Example 36 | polymer A | 60 | polymer B' | 40 | 55 |
| Example 37 | polymer A' | 60 | polymer B | 40 | 42 |
| Example 38 | polymer A' | 60 | polymer B' | 40 | 35 |

COMPARATIVE EXAMPLE 6

In Example 35, the melt-mixing reaction was stopped before the reaction mixture became transparent, or the reaction was continued for an additional 3 hours after it became transparent.

The polymer before it became transparent (10 minutes after the melting) had an elasticity recovery of 20%. The polymer obtained by further performing the reaction for 3 hours could not be molded, and its softening point was about 80° C.

EXAMPLES 39 TO 41

Block copolymers were prepared from the various aromatic polyesters and aliphatic polyesters shown in Table 11. The properties of the block copolyesters are shown in Table 11.

Table 11

| | Example 38 | Example 40 | Example 41 |
|---|---|---|---|
| Aromatic polyester | | | |
| Acid component | Terephthalic acid | Terephthalic acid | Terephthalic acid |

Table 11-continued

| | Example 38 | Example 40 | Example 41 |
|---|---|---|---|
| Glycol component | Tetramethylene glycol | Tetramethylene glycol | Ethylene glycol |
| Copolymerization component (mole % based on the entire component) | Ethylene glycol (12.5) | Isophthalic acid (10) | Neopentyl glycol (15) |
| $\eta_{sp/c}$ | 1.34 | 1.42 | 1.53 |
| Aliphatic polyester | | | |
| Acid component | Sebacic acid | Adipic acid | Decanedicarboxylic acid |
| Glycol component | Ethylene glycol | Hexamethylene glycol | Ethylene glycol |
| Copolymerization component (mole % based on the entire component) | Isophthalic acid (20) | Neopentyl glycol (20) | Isophthalic acid (15) |
| $\eta_{sp/c}$ | 1.58 | 1.24 | 1.46 |
| State at 0° C. | soft, syrupy, transparent | '' | '' |
| Weight ratio of the aromatic polyester/the aliphatic polyester | 30/70 | 60/40 | 40/60 |
| Melt-mixing time (minutes) | 30 | 50 | 40 |
| Properties of the block copolymer | | | |
| Light transmittance under parallel light rays (%) | 76 | 67 | 73 |
| Tensile strength Kg/cm² | 124 | 225 | 146 |
| Tensile elongation (%) | 680 | 390 | 520 |
| Elasticity recovery after 20% stretch (%) | 81 | 73 | 79 |

EXAMPLE 42

1. Preparation of Aromatic Polyester

An ester-interchange vessel equipped with a rectification column was charged with 97 parts of dimethyl terephthalate, 67 parts of tetramethylene glycol, 12 parts of polytetramethylene glycol and 0.05 part of titanium butoxide, and the temperature of the inside of the vessel was gradually raised, and ester-interchange was performed so that the temperature of the top of the rectification column was maintained at not more than 65° C. Methanol formed was distilled off. The amount of the distillate was 29 parts.

The ester-interchanged melt was transferred to a polymerization vessel, and allowed to stand for 10 minutes at 240° C. Then, the pressure was reduced, and the reaction mixture was maintained at 20 mmHg for 30 minutes. The pressure was gradually reduced down to 0.6 mmHg, and the reaction was continued at 0.6 mmHg. In about 60 minutes after the pressure became 0.6 mmHg, nitrogen was introduced to elevate the pressure. The polymer was discharged from the lower part of the vessel, cooled, and cut to form chips having a reduced viscosity of 1.61.

2. Preparation of Aliphatic Polyester

A stirred vessel equipped with a rectification column was charged with 174 parts of dimethyl adipate, 199 parts of tetramethylene glycol and 0.1 part of titanium tetrabutoxide, and heated by a jacket. The temperature of the inside of the vessel was gradually raised, and ester interchange was performed so that the temperature of the top of the rectification column was maintained at not more than 65° C. 64 Parts of a distillate was obtained. The resulting ester-interchanged product was transferred to a polymerization vessel. The temperature of the inside of the vessel was maintained at 240° C., and tetramethylene glycol that distilled out was collected over a period of about 30 minutes. The degree of vacuum was gradually increased down to 30 mmHg. Furthermore, the reaction was performed for 40 minutes at this pressure. Then, the degree of vacuum was increased further, and the reaction was performed for 2 hours at 0.6 mmHg. The resulting polyester had a reduced viscosity of 1.31.

3. Preparation of Block Copolymer

50 Parts of the polymer obtained in (1) above was mixed with 50 parts of the polymer obtained in (2) above, and they were melted in a vessel in a nitrogen atmosphere at an external temperature of 260° C. In about 15 minutes, there was hardly any mass, and in about 25 minutes, the reaction mixture became transparent. Thirty minutes later, the reaction product was taken out and cooled. A period of about 5 minutes was required for taking it out. The resulting chips were dried at 100° C. for 4 hours, and molded by a 3.5-ounce molding machine (a product of Nikko-Ankerwerk, Japan), while maintaining the cylinder temperature and the mold temperature at 210° C. and 60° C., respectively. The various properties of the molded articles were measured. The results are shown in Table 12.

EXAMPLES 43 TO 57

The same polyesters as obtained in Example 42 were melt-mixed in the same way as in Example 42 in the proportions shown in Table 12. The results obtained are shown in Table 12.

COMPARATIVE EXAMPLES 7 AND 8

The procedure of Example 42 was repeated except that the amount of polytetramethylene glycol was changed so that the polytetramethylene glycol content of the block copolyester was more than 50% by weight. The properties of the block copolyesters are shown in Table 12. It can be seen that when the polytetramethylene glycol content exceeded 50% by weight, the light resistance of the polymer was very inferior.

EXAMPLE 58

Polymers in chip form having the compositions shown in Table 12 were fed in the weight proportion shown in Table 12 into an extruder with a die diameter of 50 mm (P-50-22AB/28AB-V), a product of Nippon Seikosho), and melt-mixed at the temperature shown in Table 12. The properties of the polymer obtained are shown in Table 12.

Table 12

| | Aromatic polyester (I) (wt. %) | | | | | | | Aliphatic polyester (II) (wt. %) | | | | | | |
|---|---|---|---|---|---|---|---|---|---|---|---|---|---|---|
| | $C_4T$ | $C_2T$ | $C_3T$ | $C_4I$ | $C_4A$ | $C_2A$ | PTMG | $C_4A$ | $C_2A$ | $C_4S$ | $C_4D$ | $C_4T$ | $C_2T$ | PTMG |
| Comparative Example 7 | 40 | | | | | | | 60 | 40 | | | | | 60 |
| Comparative Example 8 | 50 | | | | | | | 50 | 40 | | | | | 60 |
| Example 42 | 90 | | | | | | 10 | 100 | | | | | | 0 |
| Example 43 | 80 | | | | | | 20 | 100 | | | | | | 0 |

Table 12-continued

| | | | | | | | | | |
|---|---|---|---|---|---|---|---|---|---|
| Example 44 | 100 | | | | 0 | 70 | | | 30 |
| Example 45 | 50 | | | | 50 | 100 | | | 0 |
| Example 46 | 70 | | | | 30 | 70 | | | 30 |
| Example 47 | 50 | | | | 50 | 70 | | | 30 |
| Example 48 | 90 | | | | 10 | 90 | | | 10 |
| Example 49 | 40 | 20 | | | 40 | 70 | | 30 | |
| Example 50 | 40 | | 40 | | 20 | 80 | | | 20 |
| Example 51 | 60 | 20 | | | 20 | 80 | | | 20 |
| Example 52 | 60 | | 20 | 40 | 20 | 80 | | | 20 |
| Example 53 | 60 | | | 40 | 0 | 60 | | | 40 |
| Example 54 | | 50 | | | 50 | 0 | 50 | | 50 |
| Example 55 | 80 | | | | 20 | | 80 | | 20 |
| Example 56 | 70 | | | | 30 | | | 80 | 20 |
| Example 57 | 80 | | | | 20 | | 60 | 20 | 20 |
| Example 58 | 40 | 20 | | | 40 | 70 | | 30 | 0 |

| | Blend weight ratio of (I)/(II) | Block co-polymerization temperature (°C.) | PTMG (wt. %) | Elasticity recovery (%) | Softening point (°C.) | Strength retention in boiling water (%) 1) | Light resistance time (hours) 2) |
|---|---|---|---|---|---|---|---|
| Comparative Example 7 | 2/1 | 260 | 60 | 76 | 187 | 102 | 40 |
| Comparative Example 8 | 1/1 | 260 | 55 | 77 | 203 | 99 | 60 |
| Example 42 | 1/1 | 260 | 5 | 82 | 210 | 81 | 620 |
| Example 43 | 1/2 | 260 | 6.7 | 76 | 208 | 88 | 600 |
| Example 44 | 1/2 | 260 | 20 | 85 | 210 | 95 | 240 |
| Example 45 | 1/1 | 260 | 25 | 80 | 180 | 102 | 230 |
| Example 46 | 1/1 | 260 | 30 | 71 | 185 | 105 | 200 |
| Example 47 | 1/1 | 260 | 40 | 78 | 202 | 98 | 120 |
| Example 48 | 1/2 | 260 | 10 | 90 | 205 | 85 | 380 |
| Example 49 | 1/2 | 240 | 13 | 75 | 189 | 90 | 400 |
| Example 50 | 1/1 | 240 | 20 | 69 | 175 | 90 | 360 |
| Example 51 | 1/1 | 240 | 20 | 79 | 190 | 87 | 400 |
| Example 52 | 1/2 | 240 | 20 | 81 | 194 | 95 | 420 |
| Example 53 | 1/1 | 240 | 20 | 90 | 187 | 98 | 340 |
| Example 54 | 2/1 | 240 | 17 | 77 | 223 | 83 | 300 |
| Example 55 | 1/2 | 240 | 20 | 78 | 206 | 89 | 340 |
| Example 56 | 1/1 | 240 | 25 | 72 | 190 | 95 | 200 |
| Example 57 | 1/2 | 240 | 20 | 80 | 185 | 85 | 320 |
| Example 58 | 1/2 | 240 | 13 | 92 | 188 | 90 | 420 |

1) The strength retention after boiling the sample for 24 hours in boiling water at the boiling point under atmospheric pressure. The strength was the tensile strength in accordance with JIS K-6301.
2) The sample used was a film having a thickness of 200 microns. It was exposed to light from a Xenon lamp, and the time which elapsed until cracking occurred in the film was measured. The measuring instrument used was a sunshine weather-ometer (WE-SUN-DC, a product of Toyo Rikagaku Kogyo). The measurement temperature was 50° C. ± 2° C.
3) The abbreviations used in Table 12 stand for the following.
    $C_4T$: polytetramethylene terephthalate
    $C_2T$: polyethylene terephthalate
    $C_3T$: polytriethylene terephthalate
    $C_4I$: polytetramethylene isophthalate
    $C_4A$: polytetramethylene adipate
    $C_2A$: polyethylene adipate
    $C_4S$: polytetramethylene sebacate
    $C_4D$: polytetramethylene decanedicarboxylate
PTMG: polytetramethylene glycol

EXAMPLE 59 AND COMPARATIVE EXAMPLE 9

30 Parts of polytetramethylene terephthalate having a reduced viscosity of 1.20 (0.03 mole%, based on the terephthalic acid, of titanium tetrabutoxide was used as a catalyst) and 60 parts of polytetramethylene adipate having a reduced viscosity of 1.11 (0.03 mole%, based on the adipic acid component, of titanium tetrabutoxide was used as a catalyst) were melted at 250° C. and 0.1 mmHg. After reacting for 40 minutes, the melt became transparent. The resulting block copolyester had a reduced viscosity of 1.63, a softening point of 192° C., and an elasticity recovery of 66% after 20% stretch and 5-minute relaxation. The softening points and reduced viscosities of polymers obtained after reacting the transparent melt for an additional 15 minutes and 30 minutes are shown in Table 13.

For comparison, the same reaction as above was performed except that polyethylene terephthalate having a reduced viscosity of 1.41 (0.03 mole%, based on the terephthalic acid, of titanium tetrabutoxide was used as a catalyst) was used instead of the polyethylene terephthalate, and the melt-reaction temperature was changed to 280° C. The melt became transparent in 10 minutes. The resulting block copolyester had a reduced viscosity of 1.36, a softening point of 185° C., and an elasticity recovery of 46% after 20% stretch and 5-minute relaxation. The softening points and reduced viscosities of polymers obtained after reacting the transparent melt for an additional 15 minutes and 30 minutes are shown in Table 13.

Table 13

| | Example 59 | | Comparative Example 9 | |
|---|---|---|---|---|
| | Reduced viscosity | Softening point (°C.) | Reduced viscosity | Softening point (°C.)* |
| When it was transparent | 1.63 | 192 | 1.36 | 185 |
| After additional 15 minutes | 1.90 | 169 | 1.57 | 115 |
| After additional 30 minutes | 2.08 | 151 | 1.64 | 80** |

*Measured after heat-treatment for 1 hour at 80° C. and then for 1 hour at 100° C.
**No crystallization occurred even by the above heat-treatment.

It is seen from the above table that an elastomer containing polytetramethylene terephthalate as a hard segment has higher stability than a elastomer containing polyethylene terephthalate as a hard segment.

EXAMPLE 60

30 Parts of poly-ε-caprolactone having a reduced viscosity of 1.20 (0.03 mole%, based on the ε-caprolactone, of titanium tetrabutoxide was used as a catalyst) and 60 parts of polytetramethylene terephthalate having a reduced viscosity of 1.47 (0.03 mole%, based on the terephthalic acid component, of titanium tetrabutoxide was used) were melted at 260° C. and 0.1 mmHg. In 3 hours, the melt became transparent, and at this stage, the reaction was stopped. The resulting polymer had a reduced viscosity of 0.95, a softening point of 223° C., and an elasticity recovery of 64% after 20% stretch and 5-minute relaxation.

COMPARATIVE EXAMPLE 10

An ester-interchange vessel equipped with a rectification column was charged with 97 parts of dimethyl terephthalate, 67.5 parts of tetramethylene glycol and 0.051 part of titanium tetrabutoxide, and heated to raise the temperature of the inside of the vessel gradually. Ester-interchange was performed so that the temperature of the top of the rectification column was maintained at not more than 65° C., and methanol which distilled out was removed. The resulting melt was transferred to a polymerization vessel, and allowed to stand for 10 minutes at 240° C. Then, the pressure was reduced, and at 20 mmHg, the reaction was performed for 30 minutes. The pressure was further reduced at 0.6 mmHg or below, and the polymerization was continued at this pressure to afford polytetramethylene terephthalate having a reduced viscosity of 0.99 and an end carboxyl group content of 7 equivalents /10⁶ g polymer.

55 Parts of ε-caprolactone and 0.033 part of titanium tetrabutoxide were added to the polytetramethylene terephthalate (the ratio of the polytetramethylene terephthalate to the caprolactone being 2:1), and the mixture was stirred in an atmosphere of nitrogen. The softening point and reduced viscosity of the polymer were examined after stirring for 1 hour, 2 hours, and 3 hours. The results are shown in Table 14.

Table 14

|  | Softening point (° C.) | Reduced viscosity |
|---|---|---|
| After 1 hour | 198 | 0.96 |
| After 2 hours | 199 | 0.97 |
| After 3 hours | 198 | 0.96 |

It can be seen from the results obtained that the resulting block copolymer had a softening point of at most 200° C., which was lower than that of the polymer obtained in Example 60.

What we claim is:

1. In a process for preparing a block copolyester elastomer having a softening point of at least 120° C by reacting an aromatic polyester (I) having a reduced viscosity of at least 0.4 and derived from an aromatic dicarboxylic acid or its ester-forming derivative as a main acid component with an aliphatic polyester (II) having a reduced viscosity of at least 0.4 and derived from an aliphatic dicarboxylic acid or an aliphatic hydroxycarboxylic acid or an ester-forming derivative of each of these acids in the molten state; the improvement wherein A. the aromatic polyester (I) is derived from a dicarboxylic acid component more than 70 mole % of which consists of terephthalic acid and diol component more than 70 mole % of which consists of tetramethylene glycol or trimethylene glycol, B. the weight ratio of the aromatic polyester (I) to the aliphatic polyester (II) is 0.25 to 9, and C. the reaction between the polyester (I) and the polyester (II) is carried out until a polymer is obtained which has an elasticity recovery of at least 50% after it is stretched 20% and then relaxed for 5 minutes, the reaction of the polyester (I) with the polyester (II) being carried out in the presence of a titanium-type catalyst, and after the reaction has proceeded to the stage of (C), at least one compound selected from the group consisting of phosphorus compounds of the formula

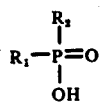

wherein $R_1$ and $R_2$ are identical to, or different from, each other, and represent a hydrogen atom, an alkyl, cycloalkyl, aralkyl or aryl group each containing not more than 20 carbon atoms or $OR_3$ in which $R_3$ represents a metal, ammonium or the same group or atom as $R_1$ independently from $R_1$, diaryl dicarboxylates of the formula

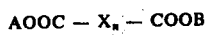

wherein $n$ is 0 or 1, X is a divalent organic group, and A and B are identical to, or different from, each other and represent a monovalent aryl group containing 6 to 20 carbon atoms and being free from an ester-forming functional group, carbonic acid esters of the formula

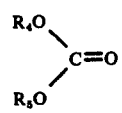

wherein $R_4$ and $R_5$ are identical to, or different from, each other, and represent an aryl group containing no ester-forming functional group, and ortho-carbonate compounds of the formula

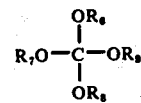

wherein $R_6$, $R_7$, $R_8$ and $R_9$ are identical to, or different from, each other, and represent a monovalent aryl group containing no ester-forming functional group,
being added in an amount which stops or inhibits the above reaction.

2. The process of claim 1 wherein the amount of the phosphorus compound to be added corresponds to at least 0.5 phosphorus atom per titanium atom.

3. The process of claim 1 wherein the amount of the diaryl dicarboxylate, carbonic acid ester or ortho-carbonate to be added is 0.5 to 5 mole% based on the entire acid component of the polyester.

4. The process of claim 1 wherein the diol component of the polyester (I) contains less than 30 mole%, based on the diol component, of a poly(alkylene oxide) glycol having a molecular weight of not more than 1,500.

5. The process of claim 1 wherein either one or both of the polyester (I) and the polyester (II) contain a unit derived from a compound containing 3 to 6 ester-forming functional groups in the molecule in an amount of 0.04 to 6 mole% based on the entire component of the block copolyester.

6. The process of claim 1 wherein the resulting block copolymer is polymerized in the solid phase at a temperature which is lower than its crystal melting point by 5° to 40° C.

* * * * *